United States Patent
Babenko

(10) Patent No.: US 6,200,014 B1
(45) Date of Patent: Mar. 13, 2001

(54) METHOD AND APPARATUS FOR MIXING HIGH MOLECULAR WEIGHT MATERIALS WITH LIQUIDS

(75) Inventor: Victor V. Babenko, Kiev (UA)

(73) Assignee: Cortana Corporation, Falls Church, VA (US)

(*) Notice: Subject to any disclaimer, the term of this patent is extended or adjusted under 35 U.S.C. 154(b) by 0 days.

(21) Appl. No.: 09/223,782

(22) Filed: Dec. 31, 1998

(51) Int. Cl.[7] ................................................ B01F 15/02
(52) U.S. Cl. ................................... 366/167.1; 366/173.1; 366/178.1; 366/175.2
(58) Field of Search ............................ 366/150.1, 151.2, 366/152.2, 155.1, 156.1, 160.1, 162.2, 163.1, 163.2, 167.1, 167.2, 168.1, 173.1, 173.2, 168.2, 169.1, 170.3, 170.4, 172.1, 178.1; 336/174.1, 175.1; 137/3, 10

(56) References Cited

U.S. PATENT DOCUMENTS

| | | | |
|---|---|---|---|
| 1,166,319 | * 12/1915 | Blichfeldt | 366/170.4 |
| 1,496,345 | * 6/1924 | Lichtenthaeler | 366/173.1 |
| 2,361,150 | * 10/1944 | Petroe | 366/173.1 |
| 2,965,362 | * 12/1960 | Flottmann et al. | 366/169.1 |
| 3,570,508 | 3/1971 | Boggs et al. . | |
| 3,601,079 | 8/1971 | Giles et al. . | |
| 3,900,043 | 8/1975 | Bowen et al. . | |
| 3,939,073 | * 2/1976 | Bats | 366/170.3 |
| 4,213,712 | * 7/1980 | Aanonsen et al. | 366/168.2 |
| 4,285,367 | * 8/1981 | Nommensen | 366/162.1 |
| 4,519,423 | * 5/1985 | Ho et al. | 366/178.1 |
| 4,549,813 | * 10/1985 | Volz et al. | 366/167.1 |
| 4,756,326 | 7/1988 | Johnston . | |
| 4,761,077 | * 8/1988 | Werner | 366/165.1 |
| 4,838,703 | * 6/1989 | McMaster et al. | 366/172.1 |
| 5,165,440 | 11/1992 | Johnston . | |
| 5,356,213 | * 10/1994 | Arpentinier | 366/178.1 |
| 5,376,697 | 12/1994 | Johnston et al. . | |
| 5,388,905 | 2/1995 | Ake et al. . | |
| 5,718,508 | * 2/1998 | Williams | 366/169.1 |

* cited by examiner

Primary Examiner—Tony G. Soohoo
(74) Attorney, Agent, or Firm—Arnold International; Bruce Y. Arnold

(57) ABSTRACT

Skin friction reduction on a surface moving relative to a fluid can be obtained by conditioning (i.e., unwinding, lengthening, or stretching) and ejecting a drag-reducing material, such as a polymer or other high molecular weight material, into the boundary layer. The efficacy of the ejected material is closely related to the hydration and shear stretching of the drag-reducing molecules immediately before ejection. The invention is a method and apparatus for creating a mixture/solution with optimal drag reduction characteristics. The device mixes a drag-reducing substance such as polymer powder, paste, solution or emulsion with a water flow, stretches the polymer molecules to improve hydration, and provides uniform vorticity to the mixture/solution before it is passed into an ejection system. By creating a mixture/solution with improved drag-reduction performance from any of several forms of drag-reducing material, the mixer can improve the performance and reduce the volume and storage requirements of a drag-reduction system.

18 Claims, 4 Drawing Sheets

METHOD AND APPARATUS FOR MIXING HIGH MOLECULAR WEIGHT MATERIALS WITH LIQUIDS

BACKGROUND OF INVENTION

Injection of high molecular weight materials, such as polymers, into the boundary layer of a fluid flow has been shown to reduce skin friction drag significantly for both vessels moving through water and for pipeline applications. The molecules of the high molecular weight material interact with turbulent activity in the near-wall region, absorbing energy and reducing the frequency of occurrence of burst and sweep cycles. Bursts, as used herein, refer to events when high energy fluid moves away from the wall, and sweeps refer to events when low energy fluid replaces the high energy fluid near the wall. The reduced occurrence of bursts results in less energy dissipation from the wall and can result in skin friction drag reductions up to 80%. Experiments have shown that the efficacy of polymer molecules for drag reduction is closely related to their molecular weight and the degree to which they have been unwound, lengthened, or stretched (hereinafter termed "conditioned").

Unfortunately, typical high molecular weight drag-reduction polymers are difficult to mix with liquids and are very slow to dissolve into solution. Mixers designed for the task frequently require power sources to drive active mixing mechanisms and holding tanks to allow the polymer to dissolve. These mixers can be large, complex and expensive. In some applications, polymer mixtures have been premixed in batches and stored before ejection into a water flow to be treated. The significant time, weight, and space requirements of premixed polymer solutions have made many applications of their drag reduction characteristics impractical and expensive.

To be useful for practical applications, a more efficient method and apparatus for mixing, with liquids, polymers that have been concentrated for optimal storage had to be devised. Many mixers for various applications exist in the prior art, but no known mixer employs the structure or methods of the present invention for "conditioning" (i.e., unwinding, lengthening or stretching) the high molecular weight materials, such as polymer.

SUMMARY OF THE INVENTION

This invention pertains to systems designed to rapidly and completely mix a substance into a liquid, particularly systems that mix/dissolve high molecular weight particulate material into a liquid and which require thorough hydration, as well as conditioning of the molecules of the particulate material in the liquid.

The innovative aspects of the mixer of the present invention allow high molecular weight drag-reducing materials, such as polymer or polymer mixtures, to be stored in a variety of forms so as to reduce storage and preparation volume requirements as compared to prior art systems by a factor of two to three. Use of a flow geometry and structures to condition the drag-reducing molecules prior to ejection into a fluid flow allows the drag-reducing material to be effective immediately upon ejection into the fluid flow, thus reducing consumption and providing drag-reduction efficiency that can further reduce the volume requirements of the drag-reduction system. Hereinafter, the mixer of the present invention will be referred to as a "volute" mixer, due to the "volute" shape (i.e., similar in shape to a cone-shaped, spiral sea shell) of the mixing chamber which serves as the primary mixing component within the mixer.

BRIEF DESCRIPTION OF THE DRAWINGS

The present invention will become more fully understood from the detailed description given below and the accompanying drawings, which are given by way of illustration only and thus are not limitative of the present invention, wherein:

FIG. 4 also illustrates the dimensions of an initially flat surface that is then cut along the spiral lines illustrated and elongated to form the downstream wall of the volute.

DETAILED DESCRIPTION

Figure 1A:
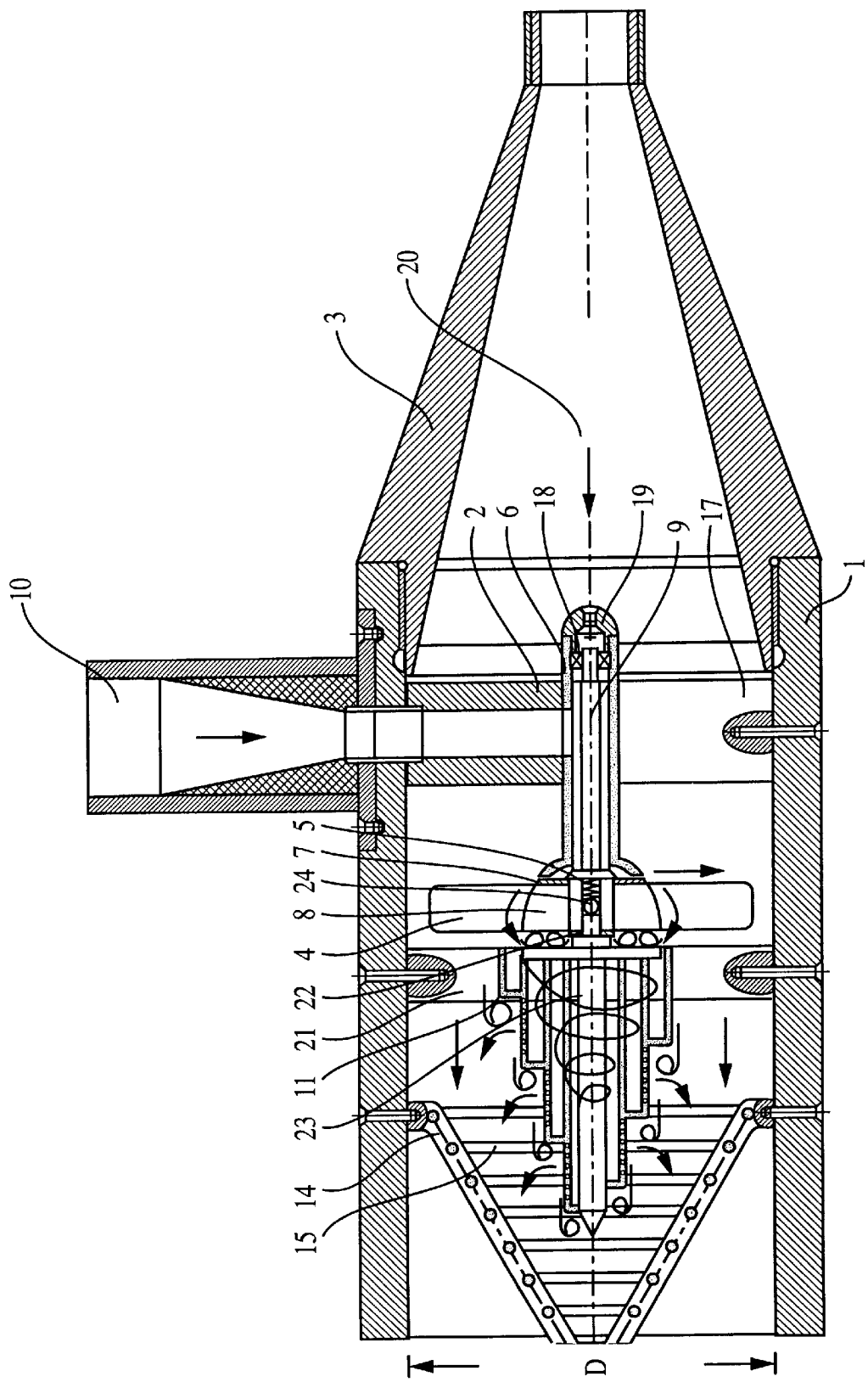
FIG. 1(a) depicts a longitudinal-section view of the mixer of the present invention, with attached accessory parts for feeding components to be mixed, and illustrates flow streams within various parts of the mixer.

FIG. 1(a) shows a longitudinal section view of the volute mixer of the present invention, with attached accessory parts for delivery of components to be mixed. The mixer is composed of a cylindrical mixer casing 1 having an inner diameter D. The mixer of the preferred embodiment is designed to continuously create a conditioned polymer-water mixture/solution using polymer powder, polymer paste, or polymer water glycerol compounds. Polymer pastes, emulsions and solutions can be fed directly into a loading cylinder 2, while polymer powder may need to be dispersed into a water flow before entering the loading cylinder 2. The volute mixer is designed so that polymer consumption will vary automatically with water flow rate above a predetermined threshold, so that polymer weight density in solution will automatically be substantially constant when mixing is in progress regardless of water flow rate. A flow adapter 3 (an accessory component to the mixer) may be used to regulate the flow velocity of liquid(s) within the mixer casing so as to be in a preferred range from 1.6 to 4.6 meters per second. Optimal solution concentrations and volume flow rates are determined as required for each application.

The volute mixer's primary mixing mechanism hydrates and conditions polymer molecules to improve their drag reduction characteristics. The function of the mixing mechanism is described below.

Figure 1B:
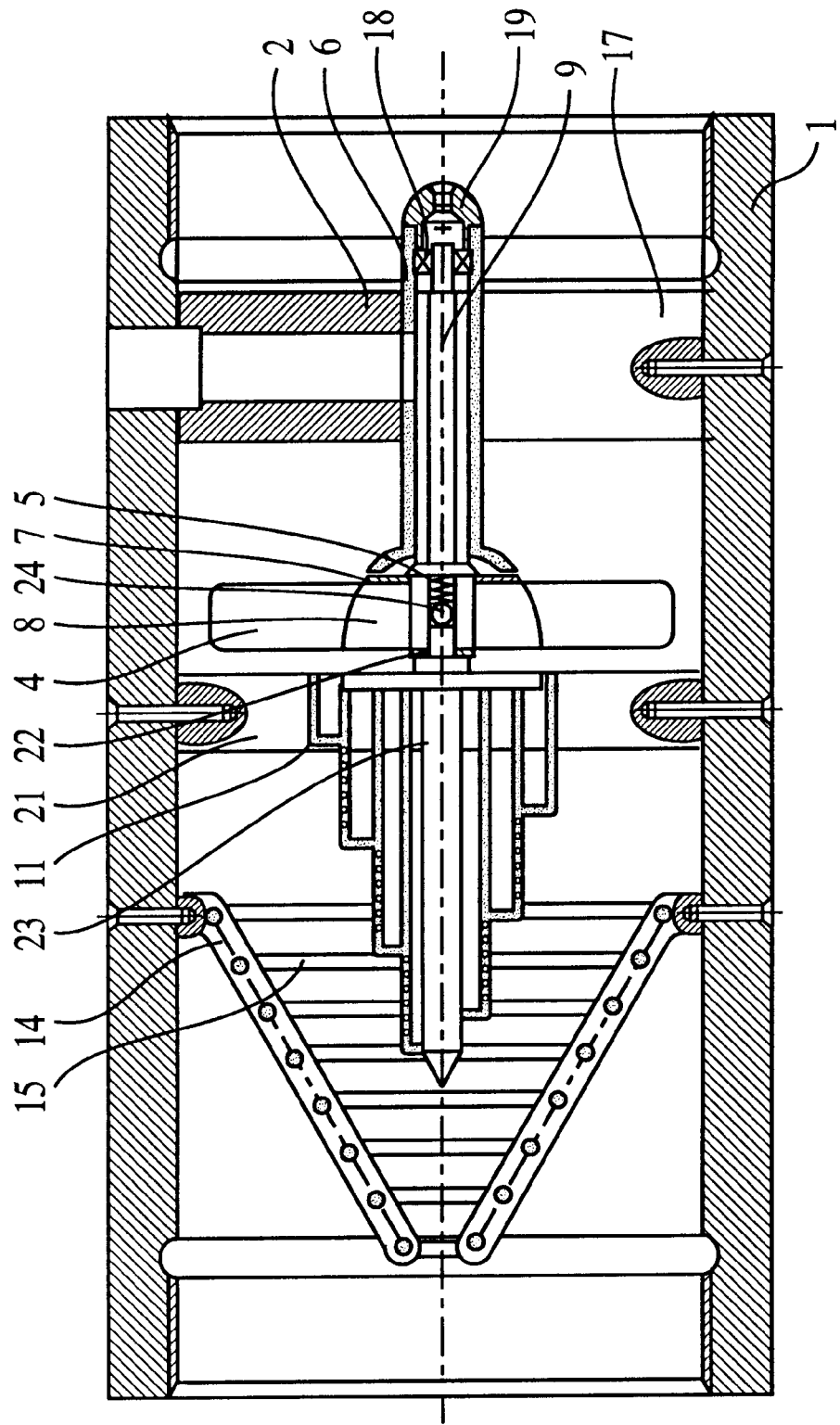
FIG. 1(b) is an expanded view of FIG. 1(a), but without accessory components used for feeding materials into the mixer, and without the arrows of FIG. 1(a) that indicate flow patterns off fluid within the mixer.

A high molecular weight drag-reducing material, such as polymer powder, paste, solution or emulsion, is loaded through the loading cylinder 2 and a fluid, such as water, enters from the right end of the mechanism, as shown in FIG. 1(a). When the water flowing through propeller 4 (which is temporarily restrained from rotation by being biased by a spring 5, best seen in FIG. 1(b), against a stationary housing 6) reaches a predetermined flow rate, it depresses the spring 5 to create a first gap between the housing 6 and a rubber gasket 7 on the front face of propeller hub 8. The first gap allows the propeller 4 to turn freely in the water flow. As it turns, it rotates an Archimedes screw 9 within housing 6. The Archimedes screw 9 conveys drag-reducing material, such as polymer, from hopper 10 (FIG. 1(a)) via loading cylinder 2 to the flowing water through the adaptive fist gap which forms between the housing 6 and the rubber gasket 7. This transfer system makes the transfer rate dependent upon the water flow rate once the adaptive first gap occurs, so that the polymer concentration in the solution will automatically adjust proportionally for flow rates above a predetermined threshold. Thus, for a given desired concentration of drag-reducing material, the design of the propeller 4, spring 5 and Archimedes screw 9 can be selected to provide the correct quantity of drag-reducing material per unit volume of water, for flow velocities exceeding a predetermined amount. As the drag-reducing particles pass through the first gap between the rubber gasket 7 and the housing 6, the rotating rubber gasket 7 imparts angular velocity to them and centrifugal effects help eject them into the water flow. The water flow moves the particles along a curved Coanda surface on the propeller hub 8. As the mixture/solution flows along this surface, the rotation of the propeller augments mixing by creating spiral vortex patterns.

The mixture/solution then follows one of three possible routes within the mixer. The majority of drag-reducing particles form a mixture that will separate from the back of the curved Coanda surface on the hub 8 of propeller 4 and be drawn into low pressure vortical structures that form in a second gap behind the hub 8 and structures just downstream thereof. After further mixing in vortices created by the second gap, the mixture/solution passes into the volute 11. The internal spiral geometry of volute 11 induces Taylor vortices in the fluid flow within volute 11.

Figure 2:
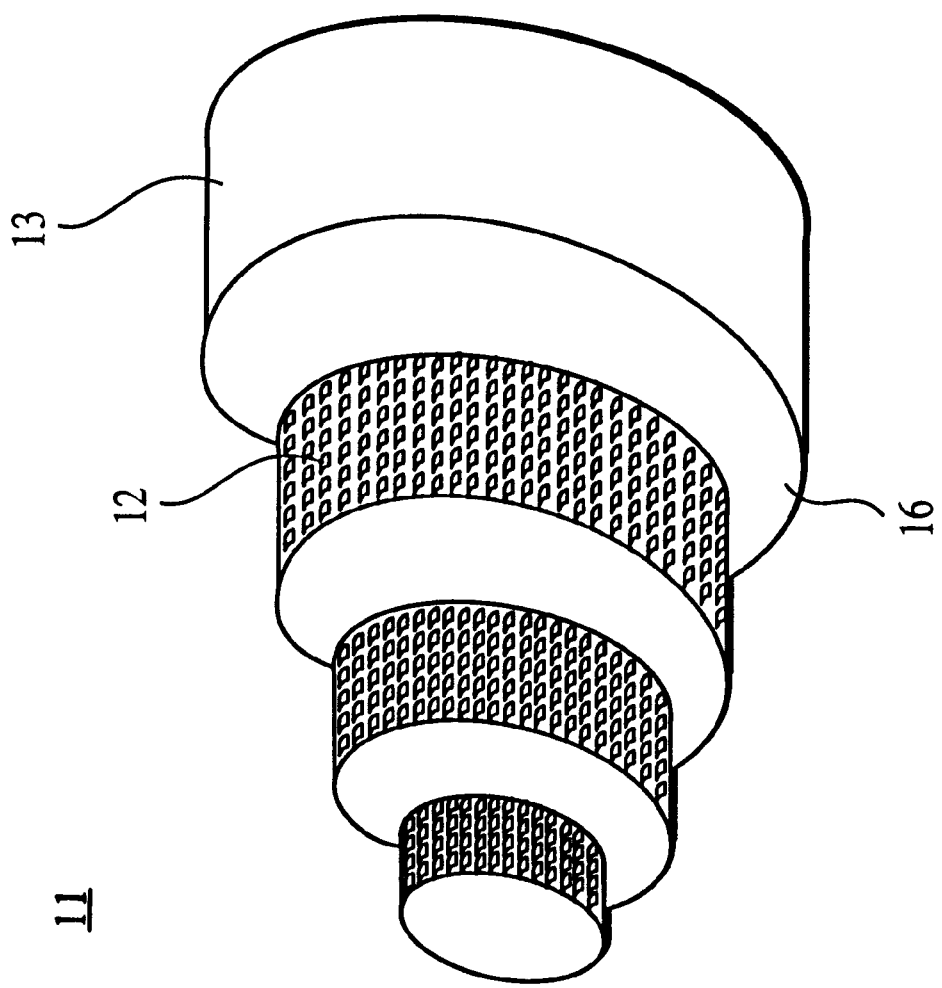
FIG. 2 shows a side view of the volute mixing chamber illustrated in FIGS. 1(a) and 1(b), but as seen from a position downstream from those views.

Referring to FIG. 2, these vortices further condition the drag-reducing molecules as they are ejected through small perforations 12 in the outer wall 13 of the volute structure. The combined effects of Taylor vortices and the internal length of the volute 11 create an order of magnitude increase in the distance traveled by the drag-reducing particles that enter the volute 11 versus those that do not enter the volute. This multiplication of the distance traveled increases the time available for the drag-reducing material to dissolve into solution.

The volute 11 structure has a maximum outer diameter d of d=0,488D, where D is the inner diameter of the mixer casing 1, and an overall length l of l=0.7D where D is as defined above.

The outer wall 13 of the volute 11 forms a spiral of pitch $\lambda_s$ given by $\lambda_s$=0.0625D, where D is as defined above, and includes the following features on its interior surface:

six spiral grooves on the interior surface of the volute 11 wall, each of width $w_s$, depth $d_s$, and pitch $\lambda_p$ given by:

$w_s$=0.029D, $d_s$=0.015D and $\lambda_p$=0.073D, where D is as defined above.

Within each spiral groove are perforations of diameter $d_p$ equal to 0.0125D and pitch $\lambda_p$ equal to 0.058D, where D is as defined above.

The groove and perforation features appear after the first full turn of the outer wall of the volute 11. They are arranged so that they allow materials flowing inside the volute 11 to pass through the outer wall of the volute 11 and into the flow outside the volute 11.

Figure 3:
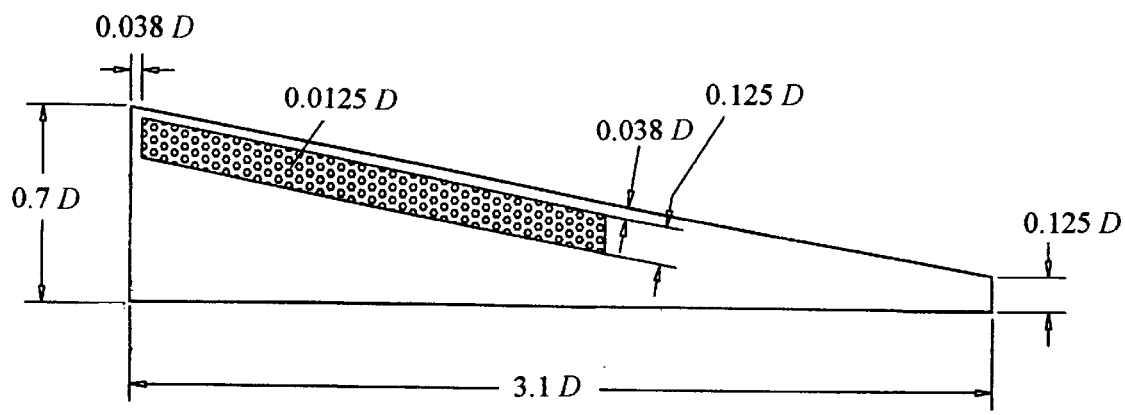
FIG. 3 is a diagram illustrating the dimensions of an initially flat surface that is then formed into a spiral in order to form the outer wall of the volute.

Referring to FIG. 3, the dimensions of an initially flat surface that is then formed into a spiral in order to form the outer wall 13 (FIG. 2) of the volute is illustrated, with the area having the small perforations 12 (FIG. 2) being illustrated. For clarity of illustration, the perforations are drawn larger in FIG. 3 than in reality, and thus fewer than 6 rows of perforations (corresponding to the six grooves) are illustrated in FIG. 3. The dimensions illustrated are given in terms of D, the inner diameter of the mixer casing.

Figure 4:
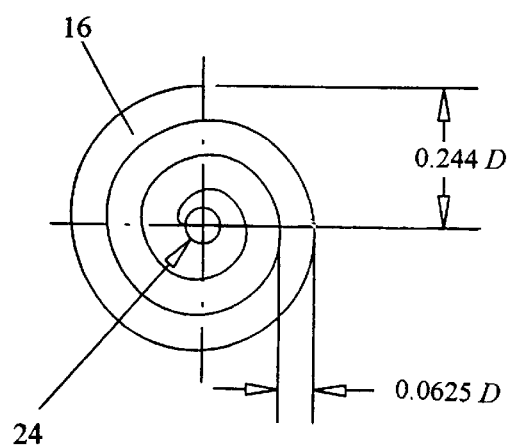
FIG. 4 is a diagram illustrating the dimensions of the outer wall of the volute after it has been formed into a spiral, as seen in end view.

FIG. 4 illustrates the dimensions of the outer wall 13 (FIG. 2) of the volute after the surface of FIG. 3 has been formed into a spiral. Again, the dimensions illustrated are given in terms of D, the inner diameter of the mixer casing.

The second possible route for the drag-reducing mixture/solution is to separate from the curved propeller hub 8, pass through the propeller 4, and flow downstream in close proximity to the outer wall of the volute 11. Each step-wise decrease in diameter of the outer wall of the volute 11, as seen by a particle traveling stream-wise in the flow exterior of the volute 11, creates low-pressure vorticity immediately downstream of the step. Drag-reducing material and water flowing in close proximity to the volute 11 are drawn into these low-pressure vortices, where they mix with elongated drag-reducing molecules and water molecules as they are ejected from the perforations 12 in the volute outer wall 13. These low pressure vortices on the exterior surface of the outer wall 13 of the volute also complement the centrifugal effects on the flow within the volute by drawing water and drag-reducing material through the volute perforations.

A third possible route for the drag-reducing mixture/solution, in this case containing very little drag-reducing material, is for it to pass through the propeller 4 and around the volute 11 at sufficient distance so that there is no interaction with the vortices created downstream of each apparent step-wise decrease in diameter of the volute outer wall 13. Along this route, little mixing occurs.

Referring to FIG. 1(a), all of the flows described above move downstream to the turbolator, which is a modular component of the mixer that can be used with other systems as a flow conditioner. The turbolator is composed of a support frame 14 which supports a series of toroids 15 each of a diameter that decreases with each downstream toroid. The toroids 15 are arranged along the axis of the mixer casing 1. Thus, the series of toroids 15 form a conical-shaped structure as seen in side view, with each toroid being approximately the same axial distance downstream from the mid-position of a respective 180 degree portion of a downstream wall 16 (FIG. 2) of the volute 11. The toroids 15 have a diameter $d_{toroid}$ given by $d_{toroid}$=0.025D where D is the inner diameter of the mixer casing, and a longitudinal (streamwise) spacing of $\lambda_{toroid}$=0.1D where D is as defined above.

Vorticity, shed behind the toroids 15 of the turbolator, creates substantially isotropic turbulence across the entire cross section of the mixer, further conditions the drag-reducing molecules, and enhances mixing of the drag-reducing material with the fluid.

The housing 6 is supported by first support vanes 17, one of which contains loading cylinder 2. The front of the housing 6 includes a sliding bearing 18 which supports a common shaft on which the Archimedes screw 9 and propeller 4 are mounted. The front of housing 6 is closed by a stopper 19, which is held in place by an axial screw. The direction of flow of fluid entering the mixer is indicated by arrow 20. Second support vanes 21 support the volute 11 as well as a support structure that supports the downstream end of the common shaft. An adjusting washer 22 may be provided to space hub 8 a desired distance from the support structure that lies just downstream from the hub 8. Thus, a second gap (not labeled) is created between the hub 8 and the support structure just behind the hub by adjusting washer 22. The rotating hub creates vortices on its upstream surface and vortices also form in a second gap behind the hub. These vortices aid in the mixing process. Also, guide pin 23 forms the center of the volute 11 structure and also supports the aft portion of propeller hub 8. Lastly, a ball bearing 24 may be used to seat the left side of spring 5.

Referring once more to FIG. 4, this figure also illustrates the dimensions of an initially flat surface that is then cut along the illustrated spiral line and elongated to form the downstream wall 16 of the volute. As shown best in FIG. 2, the downstream wall is affixed to the outer wall 13 so as to form a watertight corner seam. If the volute is made of plastic materials this seam may be heat fused or glued. If the volute is made of metal, such as brass, this seam may be soldered or brazed. The volute is secured in the flow by means of one or more support vanes at its upstream end and, at its downstream end, by guide pin 23 that fits snugly into the tip 24 of the volute structure.

Of course, the mixer of this invention is not to be limited to the embodiment specifically illustrated. Rather the scope of the invention shall be defined as set forth in the following claims and their legal equivalents. Various modifications will occur to those skilled in the art as a result of reading the above description, and all such modifications as would be obvious to one of ordinary skill in the art are intended to be within the spirit of the invention disclosed.

What is claimed is:

1. A mixer, for mixing a drag-reducing material with a liquid, said mixer comprising:
   a mixing chamber positioned in a flow path of said liquid;
   a rotatable member positioned upstream in said flow path from the mixing chamber;
   transfer means for conveying a drag-reducing material from a drag-reducing material source toward said mixing chamber, said transfer means delivering the drag-reducing material at a rate that is dependent on the liquid speed in the flow path, for liquid speeds above a given threshold, so that the drag-reducing material concentration after mixing with said liquid is substantially independent of the liquid speed in the flow path, wherein the transfer means includes an Archimedes screw within a housing, a first end of the housing being in communication with a supply of said drag-reducing material, said Archimedes screw being driven in rotation by rotation of said rotatable member to thereby convey a measured amount of drag-reducing material toward said mixing chamber for each rotation of said rotatable member.

2. The mixer as set forth in claim 1, wherein said rotatable member is moveable axially responsive to the flow rate in said flow path and is biased to press against a second end of the housing, there being a gasket attached to said rotatable member to seal the second end of the housing when the rotatable member is not rotating.

3. The mixer as set forth in claim 2, said gasket being attached to the rotatable member and imparting angular velocity to the drag-reducing material as it is ejected into the flow path, thereby using a centrifugal effect to aid in ejecting the drag-reducing material into the flow path and in mixing the drag-reducing material with liquid in the flow path when the rotatable member is rotated.

4. A mixer, for mixing a drag-reducing material with a liquid, said mixer comprising:
   a mixing chamber positioned in a flow path of said liquid;
   a rotatable member positioned upstream in said flow path from the mixing chamber;
   transfer means for conveying a drag-reducing material from a drag-reducing material source toward said mixing chamber, said transfer means delivering the drag-reducing material at a rate that is dependent on the liquid speed in the flow path, for liquid speeds above a given threshold, so that the drag-reducing material concentration after mixing with said liquid is substantially independent of the liquid speed in the flow path, wherein the shape of the mixing chamber is a volute similar to that of a conical sea-shell, and the larger end of the volute has an aperture for receiving liquid flowing in the flow path as well as receiving at least a portion of the drag-reducing material transferred by the transfer means.

5. A mixer, for mixing a drag-reducing material with a liquid, said mixer comprising:
   a mixing chamber positioned in a flow path of said liquid;
   a rotatable member positioned upstream in said flow path from the mixing chamber;
   transfer means for conveying a drag-reducing material from a drag-reducing material source toward said mixing chamber, said transfer means delivering the drag-reducing material at a rate that is dependent on the liquid speed in the flow path, for liquid speeds above a given threshold, so that the drag-reducing material concentration after mixing with said liquid is substantially independent of the liquid speed in the flow path, the rotatable member being a propeller that is movable axially, said propeller including a gasket, the propeller and gasket being biased by a spring member so as to press the gasket against a fixed surface of the transfer means and thereby prevent rotation of said propeller and escape of the drag-reducing material into the flow path until a predetermined threshold speed of liquid in said flow path is reached.

6. A mixer for mixing a drag-reducing material into a flowing liquid so as to produce a substantially constant concentration of drag-reducing material in said flowing liquid for flow speeds above a given threshold, said mixer comprising:
   a mixing chamber;
   transfer means for transferring the drag-reducing material from a drag-reducing material source toward said mixing chamber at a rate, for flow speeds above the given threshold, substantially proportional to the speed of said liquid in the flow path, and further comprising:
   turbolator means, located downstream from the mixing chamber in the flow path, for creating a substantially uniform, isotropic turbulence across the entire cross section of fluid from the mixing chamber.

7. The mixer as set forth in claim 6, said turbolator means including a series of toroids of different diameter arranged along a common axis.

8. The mixer as set forth in claim 7, wherein said different diameter toroids are arranged in order of decreasing diameter along the flow path with the toroid of largest diameter being nearest the mixing chamber.

9. The mixer as set forth in claim 8, and further comprising said mixing chamber being volute-shaped.

10. A mixer for mixing a drag-reducing material into a flowing liquid so as to produce a substantially constant concentration of drag-reducing material in said flowing liquid for flow speeds above a given threshold, said mixer comprising:

a mixing chamber;

transfer means for transferring the drag-reducing material from a drag-reducing material source toward said mixing chamber at a rate, for flow speeds above the given threshold, substantially proportional to the speed of said liquid in the flow path, and further comprising said mixing chamber being a volute having a spiral-shaped outer wall, a portion of which contains perforations.

11. The mixer as set forth in claim 10, wherein the perforations in the outer wall are arranged within grooves on the interior surface of said outer wall.

12. A mixer for mixing a drag-reducing material into a flowing liquid so as to produce a substantially constant concentration of drag-reducing material in said flowing liquid for flow speeds above a given threshold, said mixer comprising:

a mixing chamber;

transfer means for transferring the drag-reducing material from a drag-reducing material source toward said mixing chamber at a rate, for flow speeds above the given threshold, substantially proportional to the speed of said liquid in the flow path;

and further comprising a rotating propeller hub that includes a Coanda surface that creates spiral vortex patterns of the drag-reducing material particles as the mixture/solution flows along this surface as the propeller rotates.

13. A method of mixing a drag-reducing material with a liquid, said method comprising:

forming a flow path of said liquid;

imparting angular velocity to said drag-reducing material and ejecting it into the flow of the liquid at a rate that is substantially proportional to the flow rate of the liquid, for flow rates above a given threshold;

employing a mixing chamber downstream from the location that the drag-reducing material is ejected into the liquid, said mixing chamber including a wall portion that induces vortices in the flow, said wall portion including perforations therein which elongate the drag-reducing material molecules as they are ejected from the mixing chamber into the flow path; and providing a substantially isotropic turbulence downstream from the mixing chamber.

14. A turbolator for creating a substantially isotropic turbulence in a fluid flow, said turbolator comprising: a series of toroids arranged along a common axis, said toroids being of different diameter.

15. A mixer, for mixing a drag-reducing material with a liquid, said mixer comprising:

a mixing chamber positioned in a flow path of said liquid;

a rotatable member positioned upstream in said flow path from the mixing chamber;

transfer means for conveying a drag-reducing material from a drag-reducing material source toward said mixing chamber, said transfer means starting aid stopping the flow of drag reducing material such that, for liquid speeds in the flow path that are less than a given threshold, the drag-reducing flow rate is substantially zero, and for liquid speeds in the flow path that are greater than a given threshold, the drag-reducing flow rate is such that the drag-reducing material concentration after mixing with said liquid is substantially independent of the liquid speed in said flow path.

16. The mixer of claim 15, wherein said mixing chamber has a volute shape.

17. A mixer for mixing a drag-reducing material into a flowing liquid so as to produce a substantially constant concentration of drag-reducing material in said flowing liquid for flow speeds above a given threshold, said mixer comprising:

a volute-shaped mixing chamber;

transfer means for transferring the drag-reducing material from a drag-reducing material source toward said mixing chamber at a rate, for flow speeds above the given threshold, substantially proportional to the speed of said liquid in the flow path and, for flow speeds below a given threshold, for transferring no drag-reducing material into the mixing chamber.

18. A method of mixing a drag-reducing material with a liquid, said method comprising:

forming a flow path of said liquid;

imparting angular velocity to said drag-reducing material and ejecting it into the flow of the liquid at a rate that is substantially proportional to the flow rate of the liquid, for flow rates above a given threshold;

employing a volute-shaped mixing chamber downstream from the location that the drag-reducing material is ejected into the liquid, said mixing chamber including a wall portion that induces vortices in the flow, said wall portion including perforations therein which elongate the drag-reducing material molecules as they are ejected from the mixing chamber into the flow path.

* * * * *

UNITED STATES PATENT AND TRADEMARK OFFICE
CERTIFICATE OF CORRECTION

PATENT NO. : 6,200,014 B1
DATED : March 13, 2001
INVENTOR(S) : Babenko

It is certified that error appears in the above-identified patent and that said Letters Patent is hereby corrected as shown below:

<u>Column 3,</u>
Line 47, change the equation to as follows:
-- $d = 0.488D$, --

Signed and Sealed this

Twenty-fifth Day of September, 2001

Attest:

*Nicholas P. Godici*

NICHOLAS P. GODICI
*Attesting Officer*   *Acting Director of the United States Patent and Trademark Office*